United States Patent [19]

Sensibar

[11] 4,160,618
[45] Jul. 10, 1979

[54] LIQUID AGITATOR FOR HOPPER

[75] Inventor: Ezra Sensibar, Chicago, Ill.

[73] Assignee: David Sensibar Irrevocable Trust, Chicago, Ill.

[21] Appl. No.: 877,102

[22] Filed: Feb. 13, 1978

[51] Int. Cl.² .............................................. B65G 3/12
[52] U.S. Cl. .................................... 414/142; 237/589; 366/173; 406/137
[58] Field of Search ............... 302/14, 15, 16; 214/14, 214/15 B; 366/138, 173; 114/26, 36, 37; 239/589, 593

[56] References Cited

U.S. PATENT DOCUMENTS

| | | | |
|---|---|---|---|
| 1,012,196 | 12/1911 | Fruhling | 214/15 B |
| 1,127,137 | 2/1915 | West | 214/15 B |
| 1,905,223 | 4/1933 | Foresman | 302/15 |
| 2,580,214 | 12/1951 | Bozich | 302/53 |

Primary Examiner—Jeffrey V. Nase
Attorney, Agent, or Firm—Vogel, Dithmar, Stotland, Stratman & Levy

[57] ABSTRACT

A liquid agitator system for a hopper of a hopper barge includes a trunk conduit assembly and associated pumping means for pumping water under pressure to the hopper, being there coupled through a valve to a branch conduit assembly which extends downwardly into the hopper centrally thereof to an array of eccentric water discharge nozzles arranged closely adjacent to the hopper bottom for ejecting water at a velocity and in a volume sufficient to break up agglomerations of solid material and prevent the formation thereof on the hopper bottom and direct the resulting slurry to discharge ports. A barge having several hoppers is disclosed, with a nozzle array and branch conduit assembly for each hopper.

16 Claims, 8 Drawing Figures

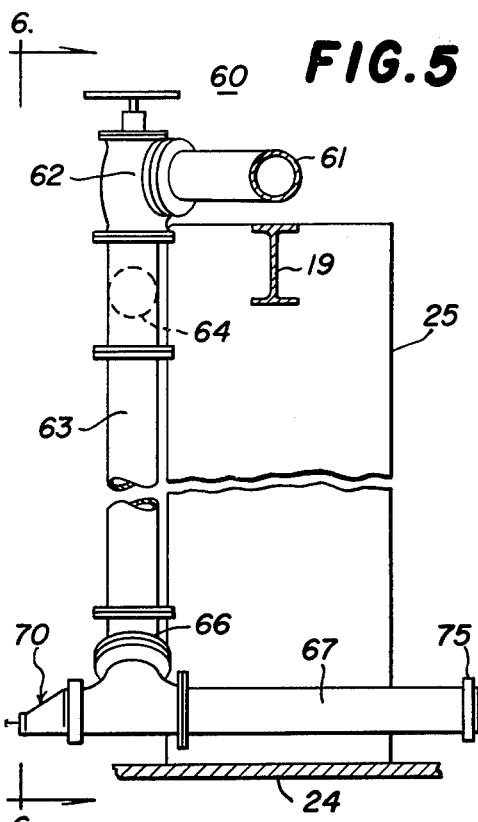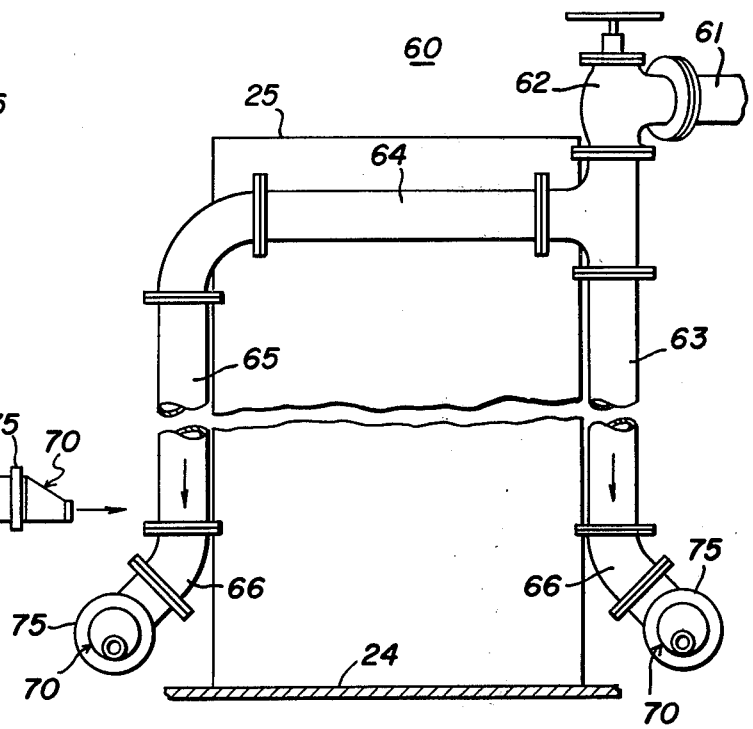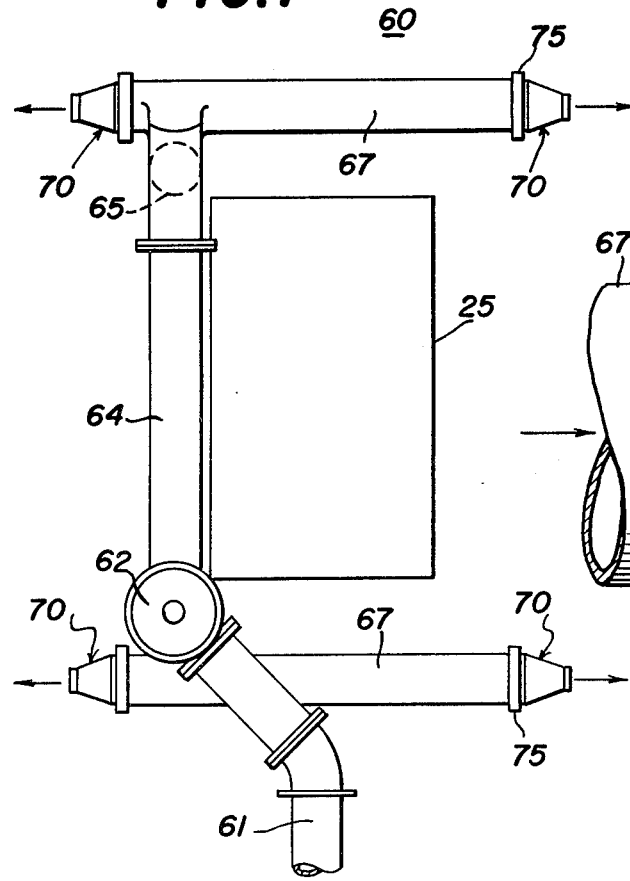

LIQUID AGITATOR FOR HOPPER

BACKGROUND OF THE INVENTION AND PRIOR ART STATEMENT

The present invention relates to hopper barge vessels and hopper dredges and, more particularly, to agitation apparatus for breaking up and/or preventing the formation of agglomerations of solid material at the bottom of a hopper, and for jetting or sluicing the resulting slurry to discharge ports.

Hopper dredges and hopper barges, particularly those used in dredging operations, normally carry a cargo of a mixture of water and solid material which is initially in the form of a slurry. The solids, however, tend to settle out at the bottom of the hopper and, even after unloading, whether by bottom dumping or by pumping overboard, a certain amount of the solid material remains on the hopper bottom. This residue of solids tends to agglomerate on the floor of the hopper and such agglomeration can foul or jam unloading apparatus in the hopper.

During loading of the hoppers, the action of the stream of material directed into the hopper serves to keep the slurry agitated and prevent agglomeration, but no convenient system is available in the prior art for breaking up agglomerations of solid material on the hopper floor after the hopper has been unloaded. U.S. Pat. No. 4,005,854 issued to David L. Patton on Feb. 1, 1977, and U.S. Pat. No. 2,241,337, issued to E. W. Work on May 6, 1941, both disclose means for introducing a stream of pressurized liquid and/or a liquid-gas combination at or near the bottom of a tank holding liquids. But these devices are simply for the purpose of setting up a circulation pattern or agitation action in an all-liquid body to achieve complete mixing of the liquids in the body. These prior art systems are not intended nor would they be suitable for agitation of bodies including solids and, in particular, for breaking up agglomerations of solid material. Indeed, it is one of the features of such prior art systems that they are relatively low-pressure devices.

In U.S. Pat. No. 3,960,101, issued to H. Suzuki on June 1, 1976, there is disclosed a system for introducing gas at the bottom of a container of solid material in a vessel, but this is solely for the purpose of drying the solid material and not for agitation thereof.

Applicant is aware of no prior art relating to the agitation of liquid-solid slurries in hoppers. Copies of the aforementioned prior art patents are filed herewith.

SUMMARY OF THE INVENTION

It is a general object of the present invention to provide means for breaking up agglomerations of solids at the bottoms of hoppers containing a liquid-solid mixture, and to prevent formation of such agglomerations, and to direct the resulting slurry to the discharge ports.

More particularly, it is an object of this invention to provide means for generating a high-pressure stream of liquid adjacent to the hopper bottom directed toward the areas where solid materials tend to agglomerate and creating a flow toward the discharge ports.

Another object of this invention is the provision of one or more fluid discharge nozzles adjacent to the hopper bottom, and conduit means for coupling the nozzles to a source of high-pressure fluid outside the hopper.

In summary, these objects are attained by providing in a hopper dredge vessel having a hopper for containing liquid and solid material with the solid material tending to agglomerate at the bottom of the hopper and having discharge ports, agitation apparatus comprising a fluid discharge nozzle disposed closely adjacent to the bottom of the hopper and directed toward areas where solid material tends to agglomerate and toward the discharge ports, conduit means connecting the discharge nozzle to a source of fluid for carrying fluid from the source to the nozzle, and pump means coupled to the conduit means for delivering fluid to the nozzle under a pressure such that the fluid is ejected therefrom in a stream having a velocity and volume sufficient to break up agglomerations of solids and carry them toward the discharge ports and prevent the formation thereof at the bottom of the hopper.

Further features of the invention pertain to the particular arrangement of the parts of the agitation apparatus whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 5 is a further enlarged fragmentary side elevational view of the agitation apparatus of the present invention;

FIG. 6 is an end elevational view of the agitation apparatus of FIG. 5, as viewed from the left-hand end thereof;

FIG. 7 is a top plan view of the agitation apparatus illustrated in FIG. 5; and

FIG. 8 is a still further enlarged fragmentary view in partial section of one of the nozzles of the agitation apparatus of the present invention.

DESCRIPTION OF THE PREFERRED EMBODIMENT

Figure 1:
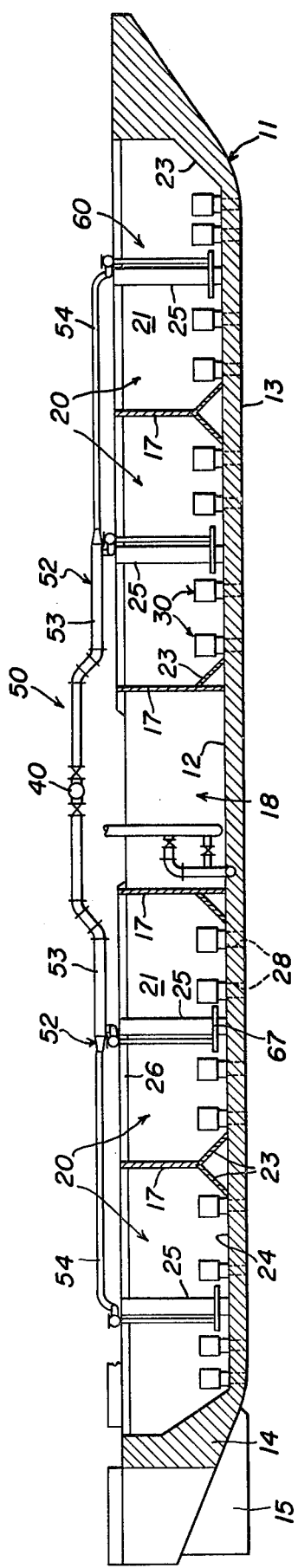
FIG. 1 is a view in vertical longitudinal section of a hopper barge having a plurality of hoppers, each including an agitation system constructed in accordance with and embodying the features of the present invention.
Figure 2:
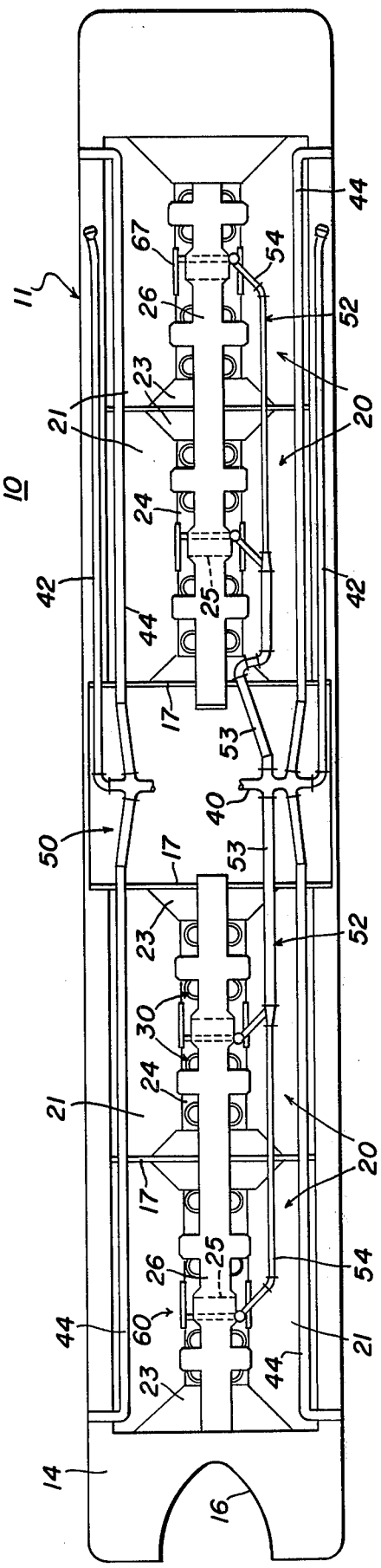
FIG. 2 is a top plan view of the hopper barge illustrated in FIG. 1.
Figure 3:
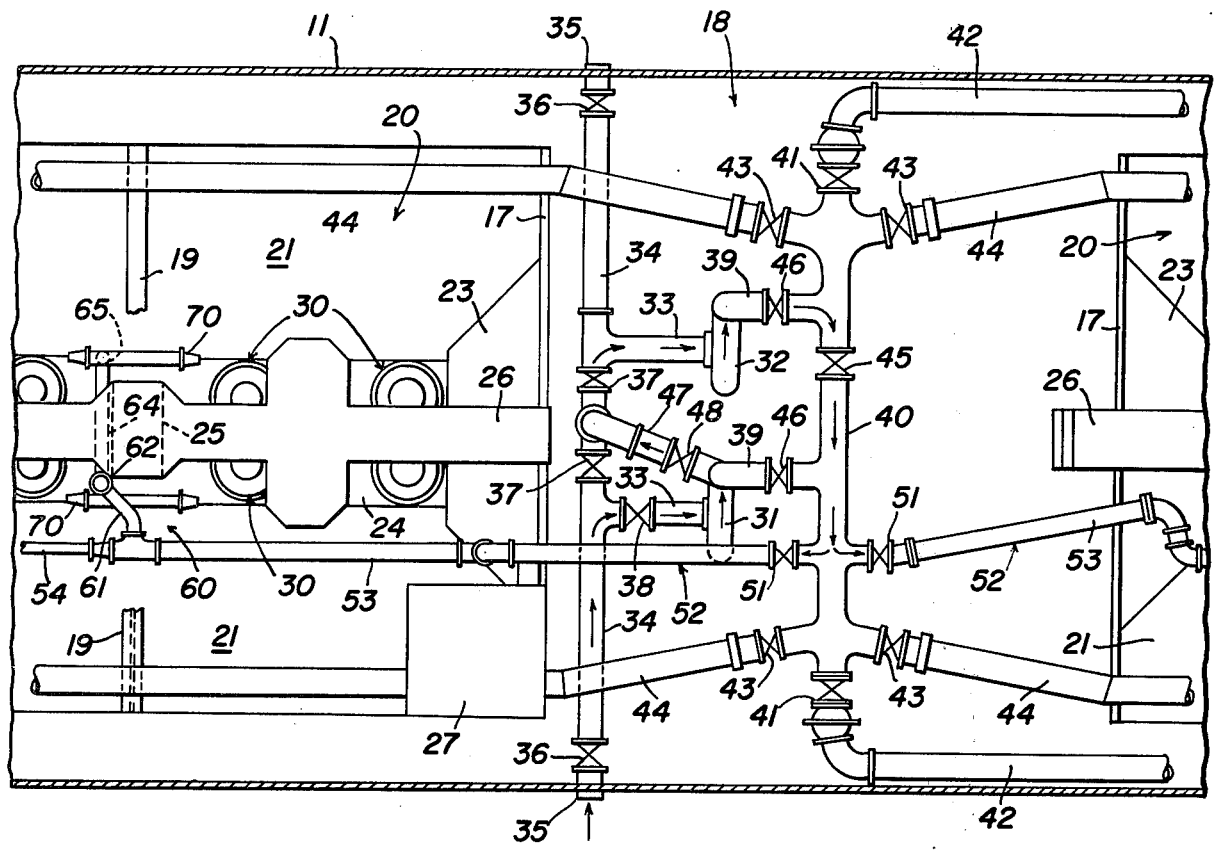
FIG. 3 is an enlarged fragmentary top plan view of the central portion of FIG. 2, illustrating a part of one hopper and the machinery compartment of the barge.
Figure 4:
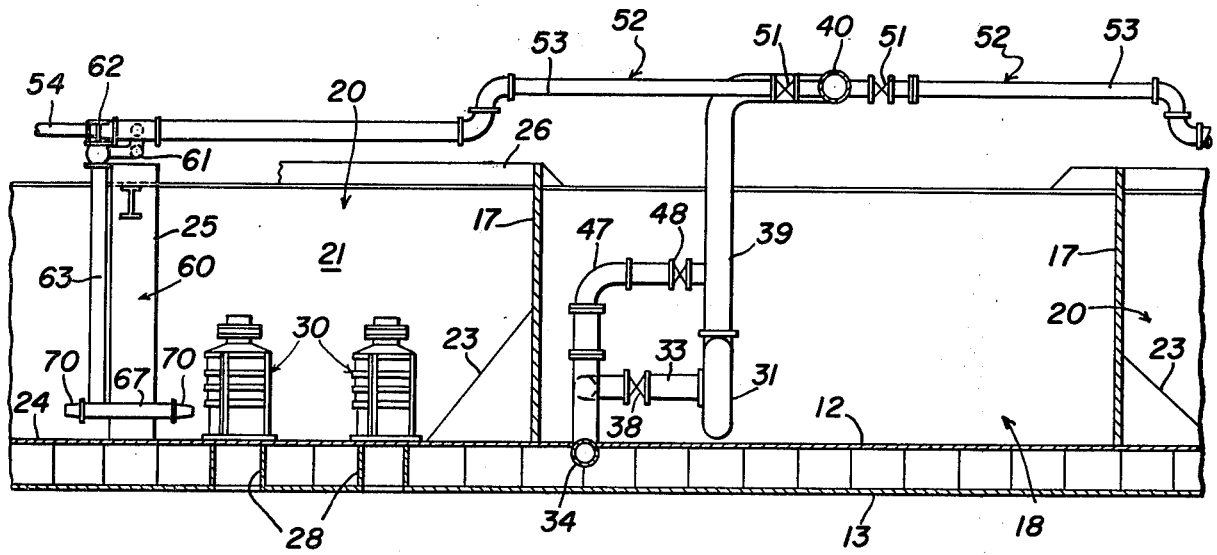
FIG. 4 is a fragmentary sectional view of the portion of the barge illustrated in FIG. 3, taken substantially along the longitudinal center line thereof.

Referring now to FIGS. 1 through 4 of the drawings, there is illustrated a hopper barge, generally designated by the numeral 10, having a hull 11, the bottom of which includes inner and outer bottom plates 12 and 13 which are, in practice, approximately five feet apart and are interconnected by suitable structural members. At its stern 14, the barge 10 is provided with a pair of laterally spaced-apart skegs 15, between which is formed a tug notch 16 for receiving the bow of an associated tugboat to propel the barge 10 through the water. In this regard, while a hopper barge has been illustrated, it will be understood that the present invention is equally applicable to self-propelled hopper vessels.

The hull 11 is divided by watertight bulkheads 17 into a plurality of compartments, the central one of which forms a machinery compartment 18, and the others of which define hoppers, each generally designated by the numeral 20. The hoppers 20 are substantially identical in construction, but in FIGS. 1 and 2 the forwardmost and aftermost hoppers 20 have been foreshortened for convenience of illustration.

Each of the hoppers 20 includes two opposed downwardly converging sloping side walls 21 interconnecting adjacent bulkheads 17 to define the hopper compartment, each of the bulkheads 17 being provided with a downwardly and inwardly sloping inclined end plate 23 adjacent to the lower end thereof, the lower ends of the end plates 23 and sloping side walls 21 joining the inner bottom plates 12 of the hull to form a flat rectangular horizontal hopper floor or bottom 24. Preferably, a vertically extending sandwell 25, substantially rectangular in transverse cross section, is disposed centrally of each hopper 20 and extends from the floor 24 thereof upwardly to an upper end above the top of the hopper, the sandwell 25 being rigidly supported by transverse support beams 19 (see FIGS. 3 and 4). Preferably, the sandwell is provided with openings adjacent to the lower end thereof to permit the liquid-solid slurry in the hopper to enter the sandwell and be pumped therefrom by suitable eduction means (not shown). The sandwells 25 have been wholly or partially eliminated from several of the figures of the drawings to facilitate illustration of the agitation system of the present invention.

Catwalks 26 are supported by the bulkheads 17 and extend longitudinally centrally of the barge 10, overlying the hoppers 20 to provide access to the control mechanism for the agitation apparatus of the present invention, as will be described more fully below. In addition, deck platforms 27 (see FIG. 3) may be provided at suitable locations at the deck level for mounting machinery and equipment thereon.

Each of the hoppers 20 is provided at the bottom thereof with eight spaced-apart discharge openings 28 which communicate with the exterior of the barge bottom. A discharge valve module 30 is mounted in place over each discharge opening 28 for opening and closing the discharge opening to permit dumping of dredged material or the like contained in the hopper 20 through the discharge openings 28. Each of the valve modules 30 may be of the type described in my U.S. Pat. No. 4,030,435, issued June 21, 1977, entitled "Hopper Valve Module For Hopper Dredge" and assigned to the assignee of the present invention, the disclosure of which patent is incorporated herein by reference.

Disposed in the machinery compartment 18 are two pumps 31 and 32, each of which has an input 33 connected to a transverse inlet pipe 34, the opposite ends of which are respectively connected through intake valves 36 to water inlets 35 at the opposite sides of the hull 11 between the inner and outer bottom plates 12 and 13 below the water line of the barge 10 when empty. Two valves 37 are also provided in the inlet pipe 34 between the pump inputs 33 for isolating the pumps 31 and 32 from each other. A valve 38 is also provided in the input of the pump 31. Each of the pumps 31 and 32 is provided with an output 39, respectively connected through valves 46 to a transversely extending cross conduit 40. The cross conduit 40 is connected at the opposite ends thereof through valves 41 to two overboard discharge conduits 42 which extend longitudinally of the barge 10 along the opposite sides thereof toward the bow, where they are adapted to be coupled to floating buoy conduits or the like for unloading the hopper contents from the sandwells 25 thereof to offshore installations.

The ends of the cross conduit 40 are also respectively connected through valves 43 to a pair of rectangular hopper filler conduits 44, which respectively extend forward and aft over the tops of the hoppers 20 adjacent to the opposite sides thereof. Each of the filler conduits 44 is provided with openings in the bottom thereof through which the slurry of dredged material may be passed to fill the hoppers 20. The cross conduit 40 is also provided with a valve 45 therein between the pump outputs 39 for isolating the pumps 31 and 32 from each other during hopper filling or discharge operations. The output of the pump 31 is also connected by a spur conduit 47 and valve 48 to the inlet pipe 34 between the valves 37 thereof for selectively operating the pumps 31 and 32 in series or in parallel, as will be explained more fully below.

The cross conduit 40 is also connected to an agitator system, generally designated by the numeral 50. More particularly, the cross conduit 40 is connected adjacent to the starboard end thereof through valves 51 to trunk conduits 52 which respectively extend forward and aft over the tops of the hoppers 20. Each of the trunk conduits 52 includes a relatively large diameter section 53 which terminates adjacent to the middle of the innermost hopper 20 at the corresponding end of the hopper barge 10, and is there coupled to a relatively small diameter section 54 which extends to the middle of the endmost hopper 20 at that end of the barge 10.

Referring now also to FIGS. 5 through 8 of the drawings, each of the trunk conduit sections 53 and 54 is coupled adjacent to the end thereof farthest from the machinery compartment 18 to an agitator assembly, generally designated by the numeral 60. The four agitator assemblies 60 are respectively disposed in the four hoppers 20 and are substantially identically constructed, wherefore only one of the agitator assemblies 60 will be described in detail. Each agitator assembly 60 includes a control valve 62 disposed adjacent to the associated catwalk 26 for access by an operator on the catwalk, and is coupled by a spur conduit 61 to the associated one of the trunk conduits 52. The valve 62 is connected to a vertically extending conduit section 63 which extends downwardly into the hopper adjacent to one side of the sandwell 25, and also to a crosstie conduit 64 which extends horizontally adjacent to the top of the hopper 20 to the opposite side of the sandwell 25, where it joins another vertically extending conduit section 65 which extends downwardly into the hopper parallel to the vertically extending conduit section 63. The conduit sections 63 and 65 are respectively coupled at the lower end thereof via two elbow sections 66 to two longitudinally extending straight conduit sections 67, the conduit sections 67 being disposed substantially parallel to each other closely adjacent to the floor 24 of the hopper 20.

The opposite ends of the straight conduit sections 67 are respectively coupled to four discharge nozzles, each generally designated by the numeral 70. More particularly, each of the nozzles 70 is preferably in the form of an eccentric reducer conduit section having a large diameter portion 71 coupled by an eccentric reducer portion 72 to a cylindrical outlet portion 73, the axis of the outlet portion 73 being parallel to but spaced below the axis of the large diameter portion 71. Preferably, the large diameter portion 71 of the nozzle 70 and the adjacent end of the straight conduit section 67 are each provided with an annular adapter fitting 74 secured thereto as by welding. In use, the adapter fittings 74 are butted together and encircled by a pipe coupling 75, preferably of the type sold under the trademark "VICTAULIC", which includes a gasket seal 76 enclosed by a pair of semicircular clamps 77 secured together by bolts or the like.

In operation, the pumps 31 and 32 are normally operated in parallel when used for pumping dredged material to the hoppers 20 or to the overboard discharge conduits 42. In that case, the valves 37, 45 and 48 are closed, so that each of the pumps 31 and 32 services one side of the barge 10, it being understood that the valves 51 are also closed during these dredging or unloading operations.

But when it is desired to operate the agitator assemblies 60, the pumps 31 and 32 are operated in series in order to achieve the desired water pressure, the pressure obtained from the series operation of the pumps being approximately double that obtained by each pump individually. For operating the agitator assemblies 60 the valves 41 and 43 are all closed and the valves 45 and 51 are opened so that water from the pump outlet will be fed only to the trunk conduits 52 of the agitation system 50. In addition, the starboard intake valve 36, the valve 38 at the inlet of the pump 31, the valve 48 at the outlet of the pump 31, the port valve 37 and the valve 46 at the outlet of the pump 32 are all opened, while the port intake valve 36, the starboard valve 37 and the valve 46 at the outlet of the pump 31 are all closed. With this arrangement, when the pumps 31 and 32 are started, water will flow along the path indicated by the arrows in FIG. 3 from the starboard water intake 35 to the trunk conduits 52 of the agitator system 50.

At each of the agitator assemblies 60, the valve 62 thereof is manually opened to admit water from the trunk conduit 52 to the nozzles 70. Preferably, the agitator assemblies 60 for the endmost ones of the hoppers 20 are opened first, and then those for the central hoppers 20 are opened in order to maintain proper weight distribution in the barge 10. When the valve 62 is opened, the water passes through the associated crosstie conduit 64 and vertical conduit sections 63 and 65, and thence through the straight conduit sections 67 to the four nozzles 70 of the agitator assembly 60. The two nozzles 70 coupled to each one of the straight conduit sections 67 are respectively directed toward the opposite ends of the associated hopper 20 and toward the valve modules 30 and associated discharge ports along one side edge of the hopper floor 24.

Thus, four streams of high-pressure water are directed substantially parallel to the hopper floor 24 toward the areas of the discharge valve modules 30, thereby creating turbulence along the hopper bottom sufficient to break up any agglomerations of solid material forming thereon and to prevent the formation of further agglomerations of solid material, and to direct and force the flow of the resulting slurry to the discharge ports in the bottom of the hopper 20. In this regard, it will be appreciated that after the hoppers 20 are emptied through the valve modules 30, the barge 10 will draw about ten feet of water above the hopper floors 24. Thus, the solid material which tends to agglomerate in the hopper 20 will be disposed at the bottom of a body of water ten feet deep. It will further be appreciated that because of the reduced diameter of the trunk conduit sections 54, the water pressure therein will be substantially the same as the water pressure in the large diameter sections 53, although the volume of water flowing therethrough is cut in half. Therefore, the pressure at the nozzle outlets will be substantially the same for each of the agitator assemblies 60.

Because solids can agglomerate in different ways on the hopper floors 24 depending upon their composition, it may be desirable to use different types of nozzles for different types of solid agglomerations. For example, in certain instances it is necessary to obtain great force to break up tightly compacted agglomerations, in which case a high velocity nozzle is needed, i.e., one with a small discharge opening. In other instances, a large volume of water is desirable to move a large volume of solids not tightly compacted, in which case a larger nozzle opening would be desirable. In this regard, the "VICTAULIC" couplings permit ready removal and replacement of the nozzles 70.

The eccentric nozzles 70 afford important advantages over more conventional concentric nozzles. First of all, the cylindrical outlet portions 73 of the nozzles 70 may be disposed more closely adjacent to the bottom 24 of the hopper than would be the case if they were concentric with the large diameter portions 71, thereby maximizing the efficiency of the water stream in directing and forcing the slurry toward the discharge ports.

Furthermore, during loading of the hopper 20 the dredged material, which is in a semi-fluid state, tends to migrate or back up into the nozzles 70. This backed up material forms a plug or pile of material inside the nozzle 70, the top of which plug is disposed a predetermined slight distance above the top of the outlet opening, determined by the water pressure in the hopper 20, with the plug sloping downwardly inside the nozzle at an angle determined by the nature of the dredged material. Since this slope angle is constant, regardless of the position of the nozzle opening, it will be appreciated that the overall horizontal length of the plug is directly proportional to the vertical distance between the top of the nozzle opening or outlet portion 73 and the bottom of the nozzle input portion 71. Since the outlet portion 73 of the eccentric nozzle 70 is closer to the bottom of the input portion 71 than would be possible with a concentric nozzle, it will be appreciated that the plug of material formed within the nozzle is shorter for the eccentric nozzle of the present invention than for a concentric nozzle. This is significant since the longer the plug, the greater the pressure is required within the nozzle to eject the plug and open the nozzles when in use.

In a constructional example of the barge 10, the pump input 33, the pipe 34, the pump output 39 and the conduits 40, 42 and 47 all have an inner diameter of 30 inches, the large diameter sections 53 of the trunk conduits 52 have a 22-inch outer diameter with 0.625-inch wall thickness, while the small diameter sections 54 thereof as well as the conduits and conduit sections 61 and 63-67 of the agitator assemblies 60, all have 16-inch outer diameters with 0.625-inch wall thickness. Preferably, the nozzles 70 are 16-inch × 8-inch eccentric reducing sections, although it will be appreciated that concentric nozzles could also be used.

Preferably, the valves 36–38, 41, 43, 45, 46, 48 and 51 are all hydraulically operated, and may be remotely controlled. However, the valves 62 of the agitator assembly 60 are preferably manually operated to require the presence of the operator so that he may watch the agitation process to be sure that it is proceeding satisfactorily.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a hopper dredge vessel having a hopper for containing liquid and solid material with the solid material tending to agglomerate at the bottom of the hopper and having a discharge port, agitation apparatus comprising a fluid discharge nozzle disposed closely adjacent to the bottom of the hopper and directed toward areas where solid material tends to agglomerate and toward the discharge port, said fluid discharge nozzle having an input end and a discharge end, the axis of said discharge end being disposed closer to the bottom of the hopper than is the axis of said input end, conduit means connecting said discharge nozzle to a source of fluid for carrying fluid from the source to said nozzle, and pump means coupled to said conduit means for delivering fluid to said nozzle under a high pressure such that the fluid is ejected therefrom in a stream having a velocity and volume sufficient to break up agglomerations of solids and carry them toward the discharge port and prevent the formation of agglomerations at the bottom of the hopper.

2. The agitation apparatus set forth in claim 1, wherein said fluid discharge nozzle is disposed substantially parallel to the bottom of the hopper.

3. The agitation apparatus set forth in claim 1, and further including coupling means detachably coupling said discharge nozzle to said conduit means.

4. The agitation apparatus set forth in claim 1, wherein said conduit means extends from said discharge nozzle substantially vertically upwardly out of the hopper.

5. The agitation apparatus set forth in claim 1, wherein the diameter of said discharge end of the nozzle is approximately one-half the diameter of said input end of the nozzle.

6. The agitation apparatus set forth in claim 1, wherein said pump means includes two pumps and means for selectively connecting said pumps in series or in parallel, said pumps being connected in series with said conduit means for operation of said agitation apparatus.

7. In a hopper dredge vessel having a hopper for containing liquid and solid material with the solid material tending to agglomerate at the bottom of the hopper and having discharge ports, agitation apparatus comprising a plurality of fluid discharge nozzles disposed closely adjacent to the bottom of the hopper and respectively directed toward areas where solid material tends to agglomerate and toward the discharge ports, each of said fluid discharge nozzles having an input end and a discharge end, the axis of said discharge end being disposed closer to the bottom of the hopper than is the axis of said input end, common conduit means connecting each of said discharge nozzles to a common source of fluid for carrying fluid from the source to said nozzles, and pump means coupled to said conduit means for delivering fluid to each of said nozzles at a high pressure such that the fluid is ejected therefrom in a stream having a velocity and volume sufficient to break up agglomerations of solids and carry them to the discharge ports and prevent the formation of agglomerations at the bottom of the hopper.

8. The agitation apparatus set forth in claim 7, wherein said fluid discharge nozzles are arranged with the axes thereof substantially coplanar and substantially parallel to the bottom of the hopper.

9. The agitation apparatus set forth in claim 7, wherein said fluid discharge nozzles are disposed substantially centrally of the bottom of the hopper.

10. The agitation apparatus set forth in claim 7, wherein said fluid discharge nozzles include a plurality of pairs of nozzles, the nozzles of each pair of nozzles being substantially coaxial and oppositely directed and the axes of the pairs being disposed substantially parallel to each other and to the bottom of the hopper.

11. The agitation apparatus set forth in claim 7, and further including valve means in said common conduit means for opening and closing said discharge nozzles simultaneously.

12. In a hopper dredge vessel having a hopper for containing liquid and solid material with the solid material tending to agglomerate at the bottom of the hopper and having discharge ports, agitation apparatus comprising a plurality of pairs of fluid discharge nozzles disposed closely adjacent to the bottom of the hopper and respectively directed toward areas where solid material tends to agglomerate and toward the discharge ports, the nozzles of each pair of nozzles being substantially coaxial and oppositely directed and the axes of the pairs being disposed substantially parallel to each other and to the bottom of the hopper, common conduit means connecting each of said pairs of discharge nozzles to a common source of fluid for carrying fluid from the source to said nozzles, said common conduit means including longitudinal conduit sections interconnecting the nozzles of each pair of nozzles and coaxial therewith, vertical conduit sections equal in number to and respectively coupled to said longitudinal conduit sections and extending substantially vertically upwardly therefrom, and a transverse conduit section interconnecting said vertical conduit sections adjacent to the top of the hopper, and pump means coupled to said common conduit means for delivering fluid to each of said nozzles at a pressure such that the fluid is ejected therefrom in a stream having a velocity and volume sufficient to break up agglomerations of solids and carry them to the discharge ports and prevent the formation of agglomerations at the bottom of the hopper.

13. In a hopper dredge vessel having a plurality of hoppers for containing liquid and solid material with the solid material tending to agglomerate at the bottoms of the hoppers where each hopper has discharge ports, agitation apparatus comprising a plurality of fluid discharge nozzle arrays equal in number to and respectively disposed in the hoppers, each of said arrays including a plurality of fluid discharge nozzles disposed closely adjacent to the bottom of the associated hopper and respectively directed toward areas where solid material tends to agglomerate and toward the associated discharge ports, each of said fluid discharge nozzles having an input end and a discharge end, the axis of said discharge end being disposed closer to the bottom of the hopper than is the axis of said input end, trunk conduit means connected to an associated source of fluid and extending to each of the hoppers for carrying fluid thereto from the source, a plurality of branch conduit assemblies equal in number to and respectively connected to said discharge nozzle arrays, each of said branch conduit assemblies connecting said trunk conduit means to each of said discharge nozzles of the corresponding one of said discharge nozzle arrays for carrying fluid thereto from the source, and pump means coupled to said trunk conduit means for delivering fluid to each of said nozzles at a high pressure such that the fluid is ejected therefrom with velocity sufficient to break up agglomerations of solids and carry them to the associated discharge ports and prevent the formation of agglomerations at the bottoms of the hoppers.

14. The agitation apparatus set forth in claim 13, wherein the hoppers are aligned longitudinally of the vessel, said pump means being disposed intermediate the ends of the vessel, and said trunk conduit means extending from said pump means longitudinally toward the opposite ends of the vessel.

15. The agitation apparatus set forth in claim 13, wherein said trunk conduit means includes large diameter sections terminating at the branch conduit assemblies spaced a first relatively short distance from said pump means, and small diameter sections terminating at the branch conduit assemblies spaced a second relatively long distance from said pump means.

16. The agitation apparatus set forth in claim 13, and further including a plurality of valves equal in number to and respectively coupling said branch conduit assemblies to said trunk conduit means for selectively controlling said discharge nozzle arrays.

* * * * *